Aug. 9, 1938.　　　C. W. CRUMRINE　　　2,126,312
SPRING FRONT CAMERA
Filed Aug. 14, 1937　　　2 Sheets-Sheet 1

Chester W. Crumrine,
INVENTOR:
BY
ATTORNEYS.

Aug. 9, 1938.　　　　C. W. CRUMRINE　　　　2,126,312
SPRING FRONT CAMERA
Filed Aug. 14, 1937　　　2 Sheets-Sheet 2

Chester W. Crumrine,
INVENTOR:
BY
ATTORNEYS.

Patented Aug. 9, 1938

2,126,312

UNITED STATES PATENT OFFICE 2,126,312

SPRING FRONT CAMERA

Chester W. Crumrine, Rochester, N. Y., assignor to Eastman Kodak Company, Rochester, N. Y., a corporation of New Jersey Application August 14, 1937, Serial No. 159,162

10 Claims. (Cl. 95—32)

This invention relates to photography and more particularly to photographic cameras. One object of my invention is to provide a camera of the folding type in which the parts are automatically projected into a picture taking position. Another object of my invention is to provide a camera composed of two rigid parts, one sliding on the other and movable to and from a picture taking position. Another object of my invention is to provide a latch mechanism by which the camera parts may be held either in an open or picture taking position or in a closed or folded position. Still another object of my invention is to provide a camera made of a number of parts so shaped that they can be readily made of a moldable composition. Another object of my invention is to provide a camera made of a series of molded parts which can be readily assembled and other objects will appear from the following specification, the novel features being particularly pointed out in the claims at the end thereof.

Coming now to the drawings wherein like reference characters denote like parts throughout:

Figure 1:
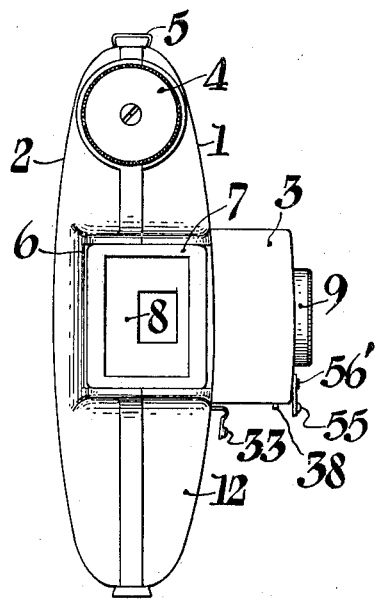
Fig. 1 is a top plan view of a camera constructed in accordance with and embodying a preferred form of my invention with the camera in an open or picture taking position.

In order to provide a relatively inexpensive folding camera which can be readily made of a number of molded parts, I prefer to form the camera body proper of two pieces of moldable material to provide a separate camera back and to provide a separate box-like sliding section which is normally spring pressed into an open or picture taking position. Each of these parts is so shaped that it may be readily made of moldable material and they are so arranged that a minimum number of operations are necessary for completely assembling the camera.

In accordance with a preferred form of my invention shown in the drawings, the camera may consist broadly of a body portion 1, a removable back 2, and a slidable front section 3. The camera body may carry the usual film winding knob 4 and any suitable latch mechanism 5 for holding the camera back 2 on the camera body. On a side wall 6, there is mounted a known type of view finder which may consist of the frames 7 and 8 each having suitable apertures which are aligned when the parts are unfolded to indicate the field of view.

The box-like section 3 carries a lens mount 9 in which an objective 10, here shown as consisting of three separate glass elements, is mounted. The objective, of course, may be of any known type and does not form a part of the present invention.

Figure 5:
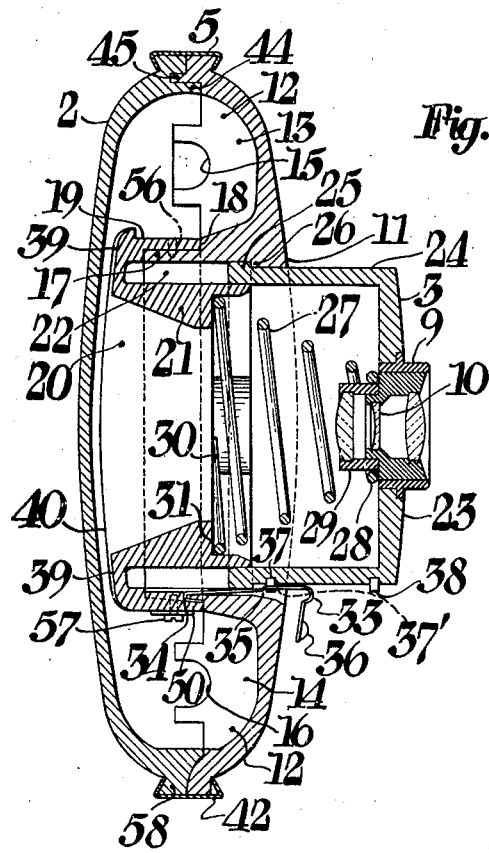
Fig. 5 is a section on line 5—5 of Fig. 4.

Referring to Fig. 5, the camera body which preferably consists of a curved front wall 11 with part side walls 12, these walls forming parts of the spool chambers 13 and 14 for the supply and take up spools which may be mounted in suitable bearings 15 and 16 so that the spools may rotate. Extending upwardly from the front wall 11 is a rectangular frame member 17 which is rabbeted at 18 to receive a complementary flange 19 on the double walled member 20. This member includes the outer wall which consists of the frame 19 and an inner wall 21 which is spaced from the outer wall so that a slot 22 will remain between the walls 19 and 21 and between the wall 17 to form a slideway for the camera front 3.

This camera front consists of a front wall 23 with rearwardly extending rectangular walls 24 the ends of which are enlarged at 25 so that as this box-like member slides on the camera body 1, the enlarged frame 25 will come to a stop against the shoulder 26 to limit the outward movement of the camera front.

This outward movement takes place because of the cone-shaped spring 27, the small end of which 28 encircles the rear end 29 of the lens barrel and the large end of which 30 lies against a flanged shoulder 31 carried on the inner walls 21 of the double walled member. This spring always exerts an outward pressure tending to separate or open the camera front 3 from the camera body 1.

After the spring has thrust the parts into the position shown, they are definitely latched together by means of the spring latched member 33 which is carried by the camera body 1 by means of a hooked end 34 which engages a formed over portion of the camera wall 1 and which extends through a slot 35 of such a width that by pressing the spring finger 36, the latch may be moved in the slot to release with the pin 37 or the pin 38 both of which are so positioned that they may be alternately engaged by means of the spring, which is apertured at 37' to receive either pin.

Figure 2:
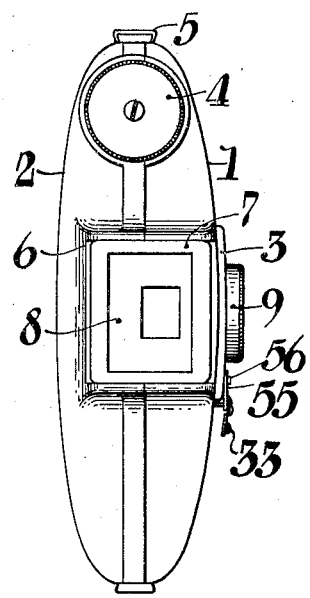
Fig. 2 is a similar view but with the parts in a folded position.

Thus, when the spring 33 is in the position shown in Fig. 5, pin 37 is engaged and the camera is definitely latched in an erect or picture taking position. When it is desired to close the camera, the push button 36 is pressed to release pin 37 and as the camera front 3 telescopes inwardly into the camera body, the pin 38 is brought into engagement with the spring 33 to hold the parts in a closed position as shown in Fig. 2.

The double walled box-like member 28 is provided with a guideway 39 over which a film is drawn from the supply chamber to the take-up chamber the film being moved across the raised rails 46 to position it for exposure. The curvature of the film inwardly is determined by the characteristics of the objective which is used with the camera. If one of the more expensive objectives having a perfectly flat field is used, it is preferable to have the film guiding rails so shaped that the film will be held in a plane. If, on the other hand, the objective has a curved field, the rails may be accordingly curved so as to position the film in the field of best focus.

The camera back 2 is provided with any suitable form of lock 5 at one end and at the other end the parts are engaged by a dove-tailed shaped metal bar 42. The camera back is removable by releasing the latch member 5 so that the spool chambers will be exposed for loading and unloading the film.

Figure 4:
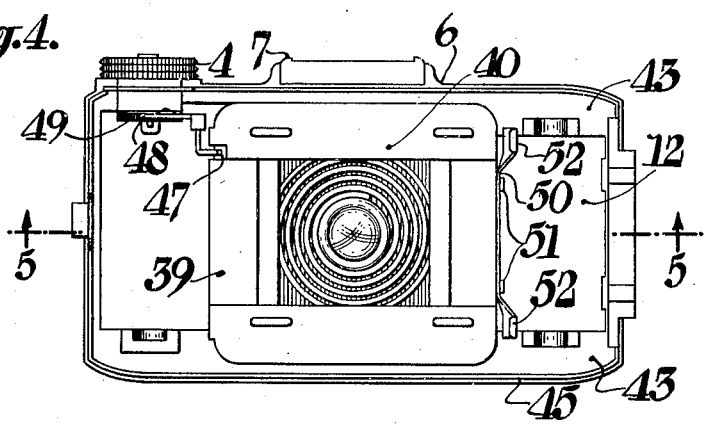
Fig. 4 is a rear elevation of the camera shown in the preceding figures but with the camera back removed.

Referring to Fig. 4, it should be noted that the camera front is arranged with flat walls 43 against which a flange 44 on the camera back is adapted to contact and there is an upstanding flange 45 extending around the flat wall to form a light-tight connection with the camera back.

The camera may be provided with a film engaging finger 47 which actuates a pawl 48 so as to stop the winding of a ratchet wheel 49 when the film winding knob 4 is being manually turned and when the finger 47 drops into an aperture in the film. However, this structure is known in the art and since it forms no part of my present invention, it will not be further described.

In the supply film spool chamber, there is a spring member 50 attached by pins 51 to the double walled member 21 and having outwardly projecting spring flanges 52. These are so positioned that they will engage the flanges of a film spool placed in the film chamber and prevent the spool from turning too freely.

Figure 3:
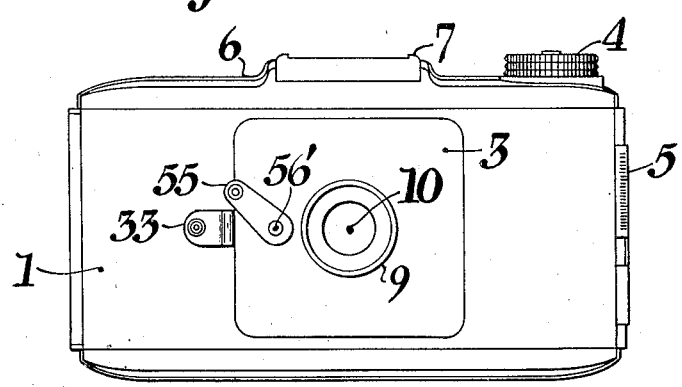
Fig. 3 is a front elevation of the camera shown in the preceding figures.

As indicated in Fig. 3, the camera front 3 is provided with a trigger member 55 for actuating the shutter, this trigger member being mounted to turn with a shaft 56' and is shown in its inoperative position in which it lies against one side of the spring 33 so that when the camera is closed as indicated in Fig. 2, the shutter trigger cannot be actuated.

This camera can be very readily assembled. Starting with the camera body member 1, the double walled member 19 is attached to the body member after first inserting the camera front 3 by merely engaging the flanges 17 and 19. As these flanges are engaged, notches in the flange 17 receive the ends of pins 56, carried by the double walled member near one spool chamber and screws 57 are used in the opposite spool chamber. These are the sole means for holding these two parts together. The spring 27 is of course inserted before the double walled member is definitely attached to the camera body. The camera back is then attached in the usual manner by entering the flange 58 behind one end of the dove-tailed metal member 42 and swinging the back into place latching the opposite end by means of the camera latch member 5.

The operation of the camera is extremely simple. When a picture is to be taken, the push button 36 is depressed releasing pin 38 from the aperture in the spring 33 and permitting the spring 27 to thrust the camera front 3 outwardly. This movement would take place very rapidly, jarring the camera, except for the fact that the enlarged portion 25 on the rectangular member 24 fits the rectangular slot 22 quite snugly and it is in effect an air lock which prevents this from moving with extreme rapidity. Of course, the structure is not air tight particularly as there is a slot 35 leading across one corner through which the camera latch 33 may function. Consequently, there is sufficient air leakage to permit the front to move rapidly but without the jarring which would otherwise occur. As soon as the camera reaches the fully open position as shown in Fig. 5, the pin 37 is engaged by the spring latch 33 so that the camera is definitely held in an open or erect position for taking pictures. It is necessary to push outwardly upon the push button 37 before releasing the camera for folding.

I claim:

1. In a camera body, the combination with a rectangular frame member through which an exposure may be made, of a camera front intimately fitting the rectangular frame and slidably mounted thereagainst, a second camera body member consisting of rectangular spaced walls forming a hollow box-like member the inner walls of which form a slideway for the camera front, and the outer walls of which intimately fit the outer walls of the rectangular frame member of the camera body to confine the walls of the camera front between the two sets of rectangular walls, and means for holding the parts in assembled relation including cooperating pins and apertures on the respective parts and screws passing laterally through pairs of adjacent rectangular walls.

2. In a folding camera, the combination with a camera body including a rectangular slot extending between walls the rear edges of which form an exposure frame, of a camera front comprising a front wall with side walls extending at right angles therefrom forming a box like structure, said side wall fitting slidably into the rectangular slot of the camera body, at least a portion of said interengaging walls and slot having a sufficiently close fit to entrap air in the slot, a spring for normally thrusting the front from the body, a latch for holding the front in folded position, said entrapped air between the camera front and body retarding the speed of separation of the parts when said latch is released.

3. In a folding camera, the combination with a camera body, of a camera front mounted thereon for movement into and out of said camera body, complementary rectangular shaped members having telescopic engagement for guiding the movement of the camera front relative to the camera body, cooperating flanges on the telescopic sections for controlling the relative extent of movement between the relatively movable parts, an annular flange on the camera front, and a spiral coiled spring the smaller end of which lies on the annular flange and the larger end of which engages a fixed frame in the camera body through which an exposure may be made.

4. In a folding camera, the combination with a camera body, of a camera front mounted thereon for movement into and out of said camera body, complementary rectangular shaped members having telescopic engagement for guiding the movement of the camera front relative to the camera body, cooperating flanges on the telescopic sections for controlling the relative extent of movement between the relatively movable parts, an annular flange on the camera front, and a spiral coiled spring the smaller end of which lies on the annular flange and the larger end of which engages a fixed frame on the camera body through which an exposure may be made, a recess between a portion of the camera body and the movable front, and a latch lying in the recess and adapted to hold the front in the camera in a folded position with said spring under compression.

5. In a folding camera, the combination with a camera body, of a camera front mounted thereon for movement into and out of said camera body, complementary rectangular shaped members having telescopic engagement for guiding the movement of the camera front relative to the camera body, cooperating flanges on the telescopic sections for controlling the relative extent of movement between the relatively movable parts, one of the rectangular member walls having a slot therein, a spring latch member including a hook shaped end lying at least partially in the slot with the hooked end engaging a wall of the slot, and means for holding the latch in place in its slot comprising a second camera body member including a box like structure walls of which engage the rectangular walls of the first mentioned camera body member.

6. In a folding camera, the combination with a camera body including a rectangular frame member, of a wall dividing the rectangular frame member transversely, a front camera wall curved to form spool chambers at either end of the rectangular frame member and intersecting said dividing wall, a second camera body member comprising a frame member with pairs of spaced box shaped walls extending from opposite edges of the frame member, the inner walls being longer than the outer wall, whereby, when assembled, the inner walls may extend substantially parallel to the rectangular frame member and the outer walls may partially enclose said inner walls and rest on said dividing wall to provide, between said rectangular box like members a slideway, and a camera front having box like walls adapted to slide between the walls of the first and second box like members and to and from an open or picture taking position.

7. In a folding camera, the combination with a camera body including a rectangular frame member, of a wall dividing the rectangular frame member transversely, a front camera wall curved to form spool chambers at either end of the rectangular frame member and intersecting said dividing wall, a second camera body member comprising a frame member with pairs of spaced box shaped walls extending from opposite edges of the frame member, the inner walls being longer than the outer wall, whereby, when assembled, the inner walls may extend substantially parallel to the rectangular frame member and the outer walls may partially enclose said inner walls and rest on said dividing wall to provide, between said rectangular box like members a slideway, and a flange on the inside of the inner walls to form a spring seat, a camera front having box like walls adapted to engage and slide in the slideway of the camera body, a spring having one end in the spring seat and the other end resting against the camera front normally tending to move the front to an open position.

8. In a folding camera, the combination with a camera body including four pairs of spaced walls forming a slideway therebetween, of a camera front having four walls movable in the slideway to and from an open or picture taking position and a closed or folded position, cooperating latch elements on the camera body and front having two operative positions, one when the camera is opened and the other when the camera is closed whereby the front may be definitely latched to the camera body when opened and closed.

9. In a folding camera, the combination with a camera body including four pairs of spaced walls forming a slideway therebetween, and one wall having a slot therein, of a spring latch member mounted in the slot, a push button for flexing the spring in the slot, a box like camera front including four walls adapted to engage and slide in the slideway, latch elements on one of said walls adapted to engage and be held by the spring latch element, one element positioned to cooperate with the spring latch element when the camera front is in one end of the slideway, the other element being positioned to cooperate with the spring latch element where the front is in the other end of the slideway.

10. In a folding camera, the combination with a camera body including four pairs of spaced walls forming a slideway therebetween, of a camera front having four walls movable in the slideway to and from an open or picture taking position and a closed or folded position, said four walls closely fitting the spaced walls forming the slideway and being adapted to temporarily entrap air therein, a groove in one of the walls, a spring latch element flexibly mounted therein, said groove extending into the slideway and permitting air to leak therethrough, a spring tending to move the camera front in the slideway to an open position, and two spaced latch elements in the wall opposite to the grooved wall, one cooperating with the spring latch to hold the camera front open and the other cooperating with the spring latch to hold the camera closed.

CHESTER W. CRUMRINE.